United States Patent [19]

Nyquist

[11] 3,718,500

[45] Feb. 27, 1973

[54] COATED ARTICLES
[75] Inventor: Edwin B. Nyquist, Midland, Mich.
[73] Assignee: The Dow Chemical Company, Midland, Mich.
[22] Filed: Nov. 14, 1969
[21] Appl. No.: 876,996

[52] U.S. Cl. ............ 117/132 R, 117/75, 117/124 E, 117/132 B, 117/132 C, 117/138.8 A, 117/138.8 F, 117/138.8 UA, 117/161 UN, 260/80.3 N, 260/86.1 N, 260/88.1 PN
[51] Int. Cl. ...................... B32b 15/08, B32b 27/30
[58] Field of Search ........ 117/161 UN, 132 B, 132 C, 138.8 F, 117/138.8 UA, 138.8 A, 124 E; 260/89.7 N, 86.1 N, 88.1 PN.80.3 N

[56] References Cited

UNITED STATES PATENTS

| 3,178,385 | 4/1965 | Dinges et al. | 117/161 UN X |
|---|---|---|---|
| 3,262,985 | 7/1966 | Muller et al. | 117/132 B X |
| 3,374,289 | 3/1968 | Ott et al. | 117/161 UN X |
| 3,535,293 | 10/1970 | Anderson | 260/86.1 N X |

Primary Examiner—Ralph Husack
Attorney—Griswold & Burdick and Albin R. Lindstrom

[57] ABSTRACT

This application discloses non-porous substrata, such as primed and unprimed metallic surfaces and plastic surfaces, coated with a continuous adherent coating of an interpolymer composed essentially of from 0.1 to 20 weight percent of an adhesion promoting monomer which is an alkyl amino alkyl acrylamide such as N,N - dimethylaminoethyl methacrylamide with the remainder of the interpolymeric composition being made up of at least one monoethylenically unsaturated comonomer.

6 Claims, No Drawings

COATED ARTICLES

BACKGROUND OF THE INVENTION

The coating of non-porous surfaces of solid substrata is replete with problems not the least of which is poor to no adhesion of coating to surface. This is especially true with metallic or plastic surfaces. The problem of lack of adhesion has been approached from a number of different viewpoints including formulation with functional adhesion promoting additives such as plasticizers; the physical or chemical treatment of the substratum surface; or the modification of the base polymer used in the coating composition. Included in such modifications are the incorporation into the polymer of carboxyl or other highly polar groups. Although frequently improving the adhesion those modifications usually either resulted in a reduction in some other property or in the creation of a new problem as for example corrosion of metals. Thus the ultimate in coating compositions has not been achieved to date.

The present invention is designed to improve adhesion to non-porous substrate substrata retaining the other desirable properties of the coating composition. That objective is achieved by incorporating from 0.1 to 20 weight percent of an N,N -dialkylaminoalkyl methacrylamide in the interpolymer forming the principal film forming component of the coating. This functional monomer is selected from those falling within the scope of the formula;

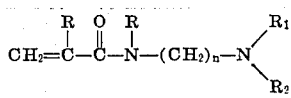

wherein R is hydrogen, methyl or ethyl; $R_1$ and $R_2$ are selected independently from the group consisting of hydrogen, methyl, ethyl and propyl and $n$ is an integer from 1 to 4.

A compound of the above formula is polymerized in a complementary amount of from 99.9 to 80 weight percent with one or more ethylenically unsaturated comonomers usually at elevated temperatures in the presence of a free radical catalyst. Ethylenically unsaturated comonomers copolymerizable with said dialkylaminoalkyl acrylamide or methacrylamide include vinyl aromatic monomers; esters of $\alpha,\beta$-unsaturated acids and in particular esters of acrylic and methacrylic acid; acrylamide or methacrylamide; acrylonitrile; vinyl alkanoates, such as vinyl acetate; open chain aliphatic conjugated dienes having from four to nine carbon atoms; vinyl pyrrolidone and N-vinyl morpholine, and the like.

Suitable aromatic monomers include styrene, vinyl toluene, $\alpha$-methyl styrene, the various halogenated styrenes such as p-chlorostyrene or 2,5-dibromostyrene, alkylated styrenes such as t-butyl styrene, vinyl naphthalene, and the like. Suitable acrylic esters include those having the formula

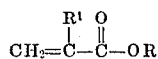

wherein R is a monovalent hydrocarbon radical containing from one to about 12 carbon atoms and $R^1$ is hydrogen or methyl. Suitable dienes include butadiene, isoprene, 2-halo-1,3-butadiene wherein halo is bromine or chlorine.

When the preferred acrylate system of monomers is employed it is preferred that the polymerization be conducted in solution. By proper choice of solvent it is possible thereby to prepare the coating composition directly without isolation of the polymer and its redispersion or redissolution. Useful solvents will be readily identified. Typical are the alkyl esters, such as ethyl acetate. Alternatively the polymer may be prepared by other known polymerization methods and a useful coating composition prepared by dissolving the isolated polymer in a suitable solvent. The useful catalysts and process parameters to be used will be those conventionally employed and will depend primarily on the particular polymerization technique employed.

The polymers are soluble in a wide variety of solvents useful in the coating arts including typically the hydrocarbons, such as xylene, the esters such as ethyl acetate, the glycol ethers such as the ethyl ether of propylene glycol and mixtures of such solvents. The optimum choice of solvent will be dictated in large part by the particular comonomers used in making the polymer. Judicious selection of such solvent will be made by simple preliminary experiment.

The amount of polymer solids used in the coating formulation will depend primarily on the application technique employed and the coating thickness desired. A spray application will require a lower viscosity solution and a lower polymer solids concentration than a brush or doctor blade technique. Thus the polymer solids concentration may vary within wide limits within the solubility parameters involved, but generally will be between about 2 to 50 weight percent solids of the combined solvent/solids weight.

Other conventional coating additives may be employed in their usual concentrations to perform their expected function. Colorants, such as dyes and pigments, fillers, stabilizers and other such additives are typical of such materials.

The coating as herein described may be applied to various non-porous substrata such as polished steel, bonderized steel, tin plate, aluminum, galvanized steel and plastic surfaces such as epoxy resins, polyesters and vinyl ester resins. The coatings will also exhibit the desirable adhesive characteristics on vitreous surfaces such as glass. The coating thickness may be widely varied but will generally be in the range of from 0.5 to about 2.0 mils. The actual thickness will be determined by economic criteria and by the expected exposure of the coated part. When used as a primer the thickness will usually be between 0.8 to 1.2 mils to achieve optimum performance.

After coating on the substratum the coatings are preferably air dried to remove the bulk of the solvent and then baked at elevated temperatures of 200°F or higher for about 30 minutes or longer. The particular drying schedule to be used will depend on the solvent employed and the coating thickness.

The inventive concept is illustrated in the following examples wherein all parts and percentages are by weight unless otherwise indicated.

EXAMPLE 1

To a 1-liter flask fitted with a stirrer, reflux condenser, nitrogen inlet tube and addition funnel benzene (150 g.) ethyl acetate (120 g.) and $\alpha,\alpha'$-azodiisobutyronitrile (AIBN) (0.2 g.) were charged. This solution was heated to reflux and the monomers mixed together (methyl methacrylate, 195 g.; butyl acrylate, 105 g.) with AIBN (2.0 g.) and added to the reaction flask over a three hour period. The monomers were purged with nitrogen for 15 minutes prior to their addition to the reaction vessel. The reaction mixture was kept under nitrogen throughout the course of the polymerization. One hour after the addition of the monomers was completed, AIBN (0.4 g.) and ethyl acetate (15 g.) were added. This was repeated again 2½ hours after the addition of the monomers was completed. Heating was continued for a total of 8 hours from the start of the monomer addition.

The above polymer solution was formulated into a paint using the following procedure:

Ball Mill for 24 Hours:
297.6 g  Polymer solution (50% solids)
150.0 g  TiO$_2$ (Ranc)
75.0 g   2-Ethoxyethyl acetate
75.0 g   Xylene The above coating was placed on various substrates with a film thickness of 0.8 – 1.2 mil. The coated panels were allowed to stand at room temperature for 40 minutes and then baked at 275°F for 35 minutes.

This same procedure was employed to prepare the other polymers listed in Table I.

The measurement of adhesion was determined using the method employing an Arco Microknife. The numerical values of Table I are defined as:

$$100/A = 10 L^{1/2}/d$$

$L$ = the load in grams on the cutting point.
$A$ = adhesion.
$d$ = the distance between cuts in mils.

High values of 100/$A$ indicate good adhesion; low values indicate poor adhesion.

3. The coated article of claim 1 wherein said solid non-porous substratum is metal.

4. The coated article of claim 3 wherein said metal is steel.

5. The coated article of claim 1 wherein said solid non-porous substratum is plastic.

In addition to adhesion, the coatings were tested for Knoop Hardness by ASTMD–1474 and Salt Spray resistance. The Salt Spray resistance was measured by scribing coated panels in two directions and placing them in a 5 percent aqueous salt spray fog in a booth for 200 hours. At the end of this time the distance that the salt spray had caused film deterioration away from the scribed lines was measured in thirty secondths of an inch. Percent solids and viscosity were determined on the non-pigmented polymers. These results are summarized in Table II. The film thickness varied between 0.8 to 1.2 mils in all cases for the coated panels.

TABLE II

| Sample Number | % * Solids | ** Viscosity | Salt Spray | Knoop Hardness |
|---|---|---|---|---|
| For Comparison |  |  |  |  |
| A1 | 50.4 | Y-Z | MFF | 19.2 |
| A2 | 49.7 | $Z_1$ | MFF | 22.2 |
| A3 | 50.0 | I | ND | 13.8 |
| This Invention |  |  |  |  |
| B1 | 50.9 | $Z_1$ | 2/32 | 21.3 |
| B2 | 50.2 | $Z_1$ | 3/32 | 19.9 |
| B3 | 49.1 | $Z_3$–$Z_4$ | ND | 19.1 |
| B4 | 49.3 | O–P | ND | 15.6 |

MFF = major film failure
ND = not determined

\* Solids were determined on unpigmented polymer
\*\* Viscosity was determined on unpigmented polymer using a Gardner Bubble Viscometer

What is claimed is:

1. A coated article consisting essentially of a solid non-porous substratum and an adherent coating thereon wherein said coating is a continuous film of an interpolymer of from about 0.1 to 20 weight percent of

TABLE I

| Sample number | Polymer composition | | | | | Adhesion to— | | | | | |
| | MMA | BA | MAA | S | DMAEM | Polished steel | *Primed steel | Tin | Polyester | Aluminum | Galvanized steel |
|---|---|---|---|---|---|---|---|---|---|---|---|
| For comparison: | | | | | | | | | | | |
| A1 | 195 | 105 | | | | 12.3 | 24.9 | 7.9 | 9.2 | 8.7 | NA |
| A2 | 195 | 105 | 3 | | | 17.7 | 25.8 | 24.7 | NA | NA | NA |
| A3 | | 105 | | 195 | | NA | NA | NA | NA | NA | NA |
| This invention: | | | | | | | | | | | |
| B1 | 195 | 105 | | | 3 | 26.7 | 25.9 | 16.6 | 23.5 | 10.6 | 13.1 |
| B2 | 194 | 104 | | | 6 | 27.6 | 25.4 | 17.0 | 26.1 | 13.1 | 17.0 |
| B3 | 175.5 | 94.5 | | | 30 | 27.3 | 30.1 | 21.0 | 19.4 | 8.0 | 14.2 |
| B4 | | 104 | | 194 | 5 | 8.8 | ND | 14.3 | 8.2 | 9.2 | 10.4 |

MMA=methyl methacrylate; BA=butyl acrylate; MAA=methacrylic acid; S=styrene; DMAEM=dimethylaminoethyl methacrylamide; NA=no adhesion; ND=not determined.
*Primer was M6J49 Red Epon Resin Baking Primer produced by the Ferbest-Schorndorfer Company.

wherein R is hydrogen, methyl or ethyl, $R_1$ and $R_2$ are selected independently from the group consisting of hydrogen, methyl, ethyl and propyl, and $n$ is an integer from 1 to 4, and complementarily from 99.9 to 80 weight percent of at least one ethylenically unsaturated comonomer.

2. The coated article of claim 1 wherein said adhesion promoting monomer is N,N-dimethylaminoethyl methacrylamide.

an adhesion promoting monomer within the scope of

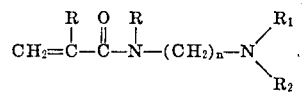

6. The coated article of claim 5 wherein said plastic is a polyester.

* * * * *